(12) United States Patent
Olsson et al.

(10) Patent No.: US 10,055,495 B2
(45) Date of Patent: Aug. 21, 2018

(54) METHOD AND SYSTEM FOR USER INITIATED QUERY SEARCHES BASED ON GAZE DATA

(71) Applicant: TOBII AB, Danderyd (SE)

(72) Inventors: Anders Olsson, Stockholm (SE); Mårten Skogö, Danderyd (SE)

(73) Assignee: Tobii AB, Danderyd (SE)

( * ) Notice: Subject to any disclaimer, the term of this patent is extended or adjusted under 35 U.S.C. 154(b) by 138 days.

(21) Appl. No.: 14/354,874

(22) PCT Filed: Oct. 29, 2012

(86) PCT No.: PCT/EP2012/071390
§ 371 (c)(1),
(2) Date: Apr. 28, 2014

(87) PCT Pub. No.: WO2013/060892
PCT Pub. Date: May 2, 2013

(65) Prior Publication Data
US 2014/0310256 A1    Oct. 16, 2014

Related U.S. Application Data

(60) Provisional application No. 61/552,904, filed on Oct. 28, 2011.

(30) Foreign Application Priority Data

Oct. 28, 2011   (EP) ..................................... 11187148

(51) Int. Cl.
*G06F 17/30* (2006.01)
*G06F 3/01* (2006.01)
(Continued)

(52) U.S. Cl.
CPC ........ *G06F 17/30864* (2013.01); *G06F 3/013* (2013.01); *G06F 3/0481* (2013.01);
(Continued)

(58) Field of Classification Search
CPC ................................................. G06F 17/30864
See application file for complete search history.

(56) References Cited

U.S. PATENT DOCUMENTS 6,437,758 B1    8/2002  Nielsen et al.
6,577,329 B1    6/2003  Flickner et al.
(Continued)

FOREIGN PATENT DOCUMENTS

CN    101382939 A    3/2009
EP    0 816 984 A2   1/1998
(Continued)

*Primary Examiner* — Syed H Hasan
(74) *Attorney, Agent, or Firm* — Kilpatrick Townsend & Stockton LLP

(57) ABSTRACT

The invention generally relates to computer implemented systems and methods for utilizing detection of eye movements in connection with interactive graphical user interfaces and, in particular, for utilizing eye tracking data to facilitate and improve information search and presentation in connection with interactive graphical user interfaces. A gaze search index is determined based on information that has been presented on an information presentation area and gaze data signals. The gaze search index comprises links between gaze search parameters and presented information that satisfies gaze filter criteria for respective gaze search parameter. A user can initiate query searches for information on the computer device or on information hosts connectable to the computer device via networks by using combinations of gaze search parameters of the gaze search index and non gaze search parameters of a non gaze search index.

31 Claims, 16 Drawing Sheets

(51) Int. Cl.
  *G06F 3/0481* (2013.01)
  *G06F 3/0484* (2013.01)
(52) U.S. Cl.
  CPC ...... *G06F 3/0484* (2013.01); *G06F 17/30032* (2013.01); *G06F 17/30321* (2013.01); *G06F 17/30424* (2013.01)

(56) References Cited

U.S. PATENT DOCUMENTS

| | | |
|---|---|---|
| 6,608,615 B1 | 8/2003 | Martins |
| 6,873,314 B1 | 3/2005 | Campbell |
| 7,576,757 B2 | 8/2009 | Kariathungal et al. |
| 7,818,324 B1 | 10/2010 | Held et al. |
| 7,881,493 B1 | 2/2011 | Edwards et al. |
| 2006/0203197 A1* | 9/2006 | Marshall ................ A61B 3/112 351/246 |
| 2009/0112817 A1 | 4/2009 | Jung et al. |
| 2009/0138458 A1* | 5/2009 | Wanker ............ G06F 17/30864 |
| 2010/0177035 A1* | 7/2010 | Schowengerdt ........ G06F 1/163 345/156 |
| 2010/0295774 A1 | 11/2010 | Hennessey |

FOREIGN PATENT DOCUMENTS

| | | |
|---|---|---|
| EP | 2 141 614 A1 | 1/2010 |
| WO | WO 2010/149824 A1 | 12/2010 |

\* cited by examiner

| Search parameters | Include in search | Exclude from search |
|---|---|---|
| Text that has been thoroughly read | X | |
| Text that has only been skimmed | X | |
| Text that was read while being distracted | | X |
| Text that caused strong emotional reaction | | X |
| Space | X | |
| Satellite | X | |

Fig. 5

Advanced search

Find pages with...

- all these words: `tobii`
- this exact word or phrase:
- any of these words:
- none of the words:
- numbers ranging from: ___ to ___

Then narrow your results by...

- language: English
- region: Germany
- last update: Anytime
- site or domain:
- terms appearing: Anywhere in the page
- Awareness: no awareness level displayed — off — moderate — strict  *(1102)*
- Safe Search:
- reading level: no reading level displayed  *(1105)*
- file type: Any format
- usage rights: not filtered by license

[Advanced Search]

METHOD AND SYSTEM FOR USER INITIATED QUERY SEARCHES BASED ON GAZE DATA

FIELD OF THE INVENTION

The invention generally relates to computer implemented systems and methods for utilizing detection of eye movements in connection with interactive graphical user interfaces and, in particular, for utilizing eye tracking data to facilitate and improve information search and presentation in connection with interactive graphical user interfaces.

BACKGROUND

Human computer interaction has been revolutionized by the introduction of the graphical user interface (GUI). Thereby, an efficient means was provided for presenting information to a user with a bandwidth that immensely exceeded any prior channels. Over the years the speed at which information can be presented has increased further through colour screens, enlarged displays, intelligent graphical objects (e.g. pop-up windows), window tabs, menus, toolbars, etc. During this time, however, the input devices have remained essentially unchanged, i.e. the keyboard and the pointing device (e.g. the mouse, track ball or touch pad). In recent years, handwriting devices have been introduced (e.g. in the form of a stylus or graphical pen). Nevertheless, while output bandwidth has multiplied several times, the input bandwidth has been substantially unchanged. Consequently, a severe asymmetry in the communication bandwidth in the human computer interaction has developed.

In order to decrease this bandwidth asymmetry as well as to improve and facilitate the user interaction, various attempts have been made to use eye-tracking for such purposes. Monitoring or tracking eye movements and detecting a person's gaze point (as used herein, the point in space at which the person is looking) can be an important information source in analysing the behaviour or consciousness of the person. It can be used both for evaluating the object at which the person is looking and for evaluating the respective person. By implementing an eye tracking device in e.g. a laptop, the interaction possibilities between the user and the different software applications run on the computer can be significantly enhanced.

Using the Internet, a computer user has access to a vast amount of information. However, selecting and identifying the most relevant or most interesting information can be a difficult challenge for the user. By utilizing gaze tracking or eye tracking data, the process of searching for such relevant or interesting information can be made more efficient and can be customized to the user needs and requirements.

In U.S. Pat. No. 6,437,758 to Nielsen et al., methods and system for dynamic adjustment of presented information based on eye-tracking data are disclosed. According to U.S. Pat. No. 6,437,758, articles and advertisements are categorized according to topics. Using gaze tracking, an information provider can determine the user's interest in each displayed article or advertisement. Then, by using the topics categorizing the presented information, the information provider can dynamically adjust the selection of subsequent information presented to the user. In an example, a user read scientific based articles but did not spend any time reading other articles or advertisements. In this case, the information provider populates the next page of information presented to the user with articles and advertisements that have similar topics as the previously read information.

Other prior art methods and systems have also been presented. In for example U.S. Pat. No. 7,881,493 to Edwards et al. customized web content is presented for a user based on eye-tracking data. The characteristics of an application are dynamically modified based on an interpretation of eye-tracking data. In U.S. Pat. No. 7,576,757 to Kariathungal et al., most read images are identified based on viewing time. Reading times for several images can be determined and a priority can be assigned to the images based on the reading time. The images can be arranged on a display based on the priority.

U.S. Pat. No. 6,608,615 to Martins discloses a method and system for passively tracking a user's eye gaze while browsing a web page to modify the presentation of the web page based on the tracked gaze. By combining historical information about a user's direction of gaze on individual cached web pages, a browser is enabled to represent regions of a web page that have been previously glanced at by the user in a modified manner.

In U.S. Pat. No. 7,818,324 to Held et al., methods and systems for searching for content on networks and computer devices are disclosed. Search engines, such as the Google™ search engine enables a user to search for information on a network via a web site by entering a search query. A search engine searches a generated searchable index and identifies resources of a corpus of resources (i.e. a collection of resources e.g. web pages, images, videos, and the like stored on one or more information host) that is responsive to the search query. By indexing the resources an efficient searching can be achieved.

The full potential of the information content of the eye tracking or gaze tracking data is not utilized in these prior art methods and systems. For example, in the methods and systems of U.S. Pat. No. 6,437,758 only topic based presentation of related information such as articles and advertisements is provided.

Accordingly, there is a need within the art for improved methods and system that provides a more efficient use of gaze tracking data for user customized information search and information presentation. There is further a need within the art for methods and system that provides an efficient use of gaze tracking data to facilitate and improve information search and information presentation.

SUMMARY OF THE INVENTION

An object of the present invention is to provide improved methods and systems for efficient use of gaze tracking data for user customized information search on computer devices and/or on network such as the Internet including information hosts.

A further object of the present invention is to provide improved methods and systems for providing an efficient use of gaze tracking data to facilitate and improve information search on computer devices and/or on network such as the Internet including information hosts.

According to an aspect of the present invention, there is provided a method for searching information using a computer device associated with an information presentation area. The method includes displaying a search window on the presentation area, which search window comprises at least one field for presenting search parameters including gaze search parameters of a gaze search index and non gaze search parameters of a non gaze search index for a user, wherein the gaze search index comprises links between gaze search parameters and information that satisfies gaze filter criteria for respective gaze search parameter. Further, input fields are displayed in the search window that allows a user to define a specific query search by selecting whether to include or exclude a specific search parameter in the specific search query. User initiated query searches for information on the computer device or on information hosts connectable to the computer device via networks are executed using selected combinations of gaze search parameters of the gaze search index and non gaze search parameters of a non gaze search index.

According to embodiments of the present invention, the gaze search index is created or determined based on information that has been presented on the presentation area for the user and gaze data signals connected with the presented information provided from a gaze tracking module associated with the computer device. The gaze search index thus comprising links between gaze search parameters and presented information that satisfies gaze filter criteria for respective gaze search parameter. The gaze data signal may include information on the user's gaze points on the information presentation area and/or relatively the information presentation area, information on the position of one or multiple eyes in front of the information presentation area, the blink frequency or duration of blinks and/or the pupil size of the eyes.

According to embodiments of the present invention, the gaze search index is created or determined based on information that has been presented for the user on presentation areas, each being associated with a computer device, and gaze data signals connected with the presented information provided from gaze tracking modules associated with the computer devices.

According to embodiments of the present invention, the gaze search index is created or determined based on information that has been presented on multiple information presentation areas, each being associated with a computer device, for multiple users and gaze data signals connected with the presented information provided from multiple gaze tracking modules associated with the computer devices. The gaze search index thus comprising links between gaze search parameters and presented information that satisfies gaze filter criteria for respective gaze search parameter. The gaze data signal may include information on the user's gaze points on the information presentation area and/or relatively the information presentation area, information on the position of one or multiple eyes in front of the information presentation area and/or the pupil size of the eyes.

The non gaze search index is typically provided by a search module provider. Thus, a user initiated query search may provide information or data corresponding to the user defined query based on a search in the gaze search index and the non gaze search index.

The non gaze search parameters or traditional search parameters are traditional in a meaning of search terms used in a search module (or search engine) such as the search engine offered by Google Inc. When performing a query search on a web site such as www.google.com it is for instance possible to choose to search for web pages, for images, for patents, for academic publications, for maps or for data on the computer. It is also possible to choose whether to only include data that has been published within a certain time period or in a certain language or that reside on servers within a specific country. All of these parameters are non gaze search parameters which on websites such as www.google.com are illustrated as options for inclusion or exclusion of data as part of a query search.

Additionally, a search query usually includes search parameters such as words to look for in the data. It is also common to have a search syntax that can be used to describe what words should be included, what words should be excluded, how close together in a document two words should be, to include document including at least one of multiple words, to allow for word stemming etc. All of these parameters are also non gaze search parameters that can be part of a non gaze search index used when performing a traditional query search. Hence, a non gaze search index is created without input of any gaze data, i.e. without any information of, for example, what a user has looked at. The non gaze search index is preferably based on aggregated data from a large number of users including information where data is stored, how data is linked to and/or linked from other data, how often users access data and how many users that access the data. The non gaze search index is continuously updated as the search module crawl the information hosts to gather information as mentioned above. However, the non gaze search index itself is not subject for the present invention and will therefore not be described in more detail herein.

According to another aspect of the present invention, there is provided a search module for information searches using a computer device associated with an information presentation area. A search module GUI client is configured to display a search window on the presentation area, the search window comprising at least one field for presenting search parameters including gaze search parameters of a gaze search index and non gaze search parameters of a non gaze search index for a user, the gaze search index comprising links between gaze search parameters and information that satisfies gaze filter criteria for respective gaze search parameter, wherein the search window further comprises fields allowing a user to define a specific query search by selecting whether to include or exclude a specific search parameter in the specific search query. Further the search module GUI client is configured to provide signals corresponding to the specific query searches to a search engine for execution of the user initiated query searches for information on the computer device and/or on information hosts connectable to the computer device via networks using selected combinations of gaze search parameters of the gaze search index and non gaze search parameters of a non gaze search index.

In embodiments, the search module GUI client is configured to display a search window comprising at least one field for presenting search parameters including gaze search parameters of the gaze search index, wherein the gaze search index is created based on information that has been presented on the presentation area for the user and gaze data signals connected with the presented information provided from a gaze tracking module associated with the computer device.

In other embodiments, the search module GUI client is configured to display a search window comprising at least one field for presenting search parameters including gaze search parameters of the gaze search index, wherein the gaze search index is created based on information that has been presented for the user on presentation areas, each being associated with a computer device, and gaze data signals connected with the presented information provided from gaze tracking modules associated with the computer devices. Hence, the user may have several computer devices and the gaze search index for that user can be based on the user's gaze pattern for all his or hers devices.

In further embodiments, the search module GUI client is configured to display a search window comprising at least one field for presenting search parameters including gaze search parameters of the gaze search index, wherein the gaze search index is created based on information that has been presented on multiple information presentation areas, each being associated with a computer device, for multiple users and gaze data signals connected with the presented information provided from multiple gaze tracking modules associated with the computer devices. Hence, the gaze search index is based on gaze patterns or gaze data aggregated from a large number of users. The gaze pattern or gaze data of the user performing the search is not necessarily included into the gaze search index.

According to a further aspect of the present invention, there is provided a system for searching information using a computer device associated with an information presentation area and a gaze tracking module. The system comprises a search module GUI client configured to display a search window on the presentation area, the search window comprising at least one area for presenting search parameters including gaze search parameters and non gaze search parameters for a user, wherein the search window further comprises fields allowing a user to define a specific query search by selecting whether to include or exclude a specific search parameter in the specific search query and to provide signals corresponding to the specific query searches to a search engine for execution of the user initiated query searches for information on the computer device and/or on information hosts connectable to the computer device via networks using selected combinations of gaze search parameters of the gaze search index and non gaze search parameters of a non gaze search index.

According to an embodiment of the system, a gaze filter module is configured to determine a gaze search index based on information that has been presented and gaze data signals, the gaze search index comprising links between gaze search parameters and presented information that satisfies gaze filter criteria for respective gaze search parameter. In one embodiment, the gaze filter module is configured to create the gaze search index based on information that has been presented on the presentation area for the user and gaze data signals connected with the presented information provided from the gaze tracking module associated with the computer device. In another embodiment, the gaze filter module is configured to create the gaze search index based on information that has been presented for the user on presentation areas, each being associated with a computer device, and gaze data signals connected with the presented information provided from gaze tracking modules associated with the computer devices. In a further embodiment the gaze filter module is configured to create the gaze search index based on information that has been presented on multiple information presentation areas, each being associated with a computer device, for multiple users and gaze data signals connected with the presented information provided from gaze tracking modules associated with the computer devices.

Thus, the present invention is based on the idea of utilizing gaze data gathered by means of a gaze tracking module or system associated with a computer device to provide improved user customized information searches. The present invention provides a more efficient use of gaze tracking data for user customized information search and information presentation by using recorded data or information of what a user reads and/or looks at on an information presentation area, such as a display, associated with the computer device as input when performing information searches for information including documents (e.g. web pages, Portable Document Format (PDF) documents, text files, or word processing documents), audio files, video files, images and the like stored in one or more information hosts and/or the computer device. The present invention allows user initiated searches to be performed or executed based on data that the user has previously looked at, or on data that the user has not looked at on the information presentation area in combination with traditional search parameters, i.e. traditional in a meaning of search terms used in a search engine such as the search engine offered by Google Inc. as have been described above.

According to the embodiments of the present invention, the search module is configured to present graphical representations on an information presentation area, wherein the graphical representation enables user input for customizing and defining a search query in accordance with user preferences. For example, a user may define which gaze search parameters not to be included in a search, select gaze search parameters to be included in the search and select non gaze search parameters to be included in the search. That is, the user may, by defining a query including a combination of gaze search parameters and non gaze search parameters, search the gaze search index and the non gaze search index for information or data corresponding to the query, which information or data may be located on a content host and/or locally on the computer device.

In embodiments of the present invention, the gaze search parameters comprise presented information that the user has looked at for at least a certain period of time; and/or presented information that the user has looked at during a period of time while being distracted; and/or presented information that has caused strong emotional reaction of the user; and/or presented information that the user has focused on; and/or articles that the user has read at least a predetermined amount of the included text; and/or articles or texts that have been thoroughly read by the user; and/or articles or texts that have been skimmed by the user and/or articles or texts the user read while being tired. The above examples are a non-exhaustive listing of conceivable gaze search parameters.

According to embodiments of the present invention, gaze data signals from several users are collected and analysed by a gaze filter module located on at least one remote server and aggregated gaze information can be provided. Thereby, it is possible to obtain aggregated gaze data information reflecting general user behaviour, for example, response on advertisements or web page designs. It is also possible to gather aggregated gaze search parameters and to create a gaze search index based on aggregated data.

According to embodiments of the present invention, at least one time criteria may be used as a further parameter to define a search query. That is, for example, the user may limit a search query to information seen on the information presentation area during a certain period of time.

According to embodiments of the present invention, a gaze search index is analyzed to determine behavioural patterns or gaze patterns over time. Such behavioural or gaze patterns over time may thus reflect user preferences. The behavioural pattern can, for example, be used to organize the presentation of the information or prioritize among the information resulting from a search defined in a user initiated query such that, for example, information reflecting more recent user interest is presented first or is given a higher priority in the presentation. In embodiments of the present invention, the gaze filter module is configured to perform the analysis.

According to embodiments of the present invention, the search module is configured to display, on the information presentation area, a search window including at least one area comprising gaze search parameters corresponding to different awareness levels or mental conditions of the user. The user may be allowed to define a search or query including only results or images that he or she gazed at being in a specific mental condition such as highly concentrated, distracted, tired, or frustrated. The user may further be allowed to select or define that the search should be made on images that the user has not seen. Additionally, the user may be allowed to define or customize conditions. The search window is further configured to display a number of areas or fields in the search window allowing the user to further define the query by also using non gaze search parameters.

According to embodiments of the present invention, the search module is configured to display, on the information presentation area, a search window including at least one area comprising gaze search parameters corresponding to emotional response of, for example, a certain image or page. These gaze search parameters reflect the emotional response of the user to previously presented images or information. For example, pupil dilation or gaze pattern of the user can be gathered to evaluate and determine the emotional response. The user may be allowed to define a search query including only results or images that resulted in a specific level of emotional response such as strong, medium, or low. Further, the user may be allowed to select or define that the search should include images not seen before. Additionally, the user may be allowed to define or customize levels of emotional response. The search module is further configured to display a number of areas or fields in the search window allowing the user to further define the query by also using non gaze search parameters. In another example embodiment, the user may be allowed to define a search query including only results or images that resulted in a specific engagement level such as strong, medium, or low.

According to embodiments of the present invention, where the user is allowed to define a query for images will be discussed. In this embodiment, images can be searched for which have given rise to a certain degree of average emotional response of multiple users. Hence, the gaze data constituting basis for the average emotional response is collected or gathered from multiple users. The search module is configured to display, on the information presentation area, a search window including at least one area comprising gaze search parameters corresponding to average emotional response of, for example, a certain image or page. These gaze search parameters reflect the average emotional response of the users to previously presented images or information. For example, pupil dilation or gaze pattern of the user can be gathered to evaluate and determine the emotional response. The search module is further configured to display a number of areas or fields in the search window allowing the user to further define the query by also using non gaze search parameters.

According to embodiments of the present invention, the search module is configured to display, on the information presentation area, a search window including at least one area comprising gaze search parameters corresponding to the reading pattern when reading the information, data or text. For example, the user may select between text, data or information that he or she has previously thoroughly read, only skimmed or not read at all. The search module is further configured to display a number of areas or fields in the search window allowing the user to further define the query also by using non gaze search parameters.

According to embodiments of the present invention, the search module is configured to display, on the information presentation area, a search window including at least one area comprising gaze search parameters corresponding to a time aspect of the viewed data or images. For example, the user may define a search or query including only results or images that he or she gazed at during the past 24 hours, the past week, seen any time or never seen. Further, the user may also be allowed to customize time ranges. The search module is further configured to display a number of areas or fields in the search window allowing the user to further define the query by also using non gaze search parameters.

Further objects and advantages of the present invention will be discussed below by means of exemplifying embodiments.

These and other features, aspects and advantages of the invention will be more fully understood when considered with respect to the following detailed description, appended claims and accompanying drawings.

BRIEF DESCRIPTION OF THE DRAWINGS

The drawings are not necessarily drawn to scale and illustrate generally, by way of example, but no way of limitation, various embodiments of the present invention. Thus, exemplifying embodiments of the invention are illustrated by way of example and not by way of limitation in the figures of the accompanying drawings in which like references indicate similar elements. It should be noted that references to "an" or "one" embodiment in this discussion are not necessarily to the same embodiment, and such references mean at least one.

FIG. 5 is a schematic illustration of a graphical representation of a search window according to the present invention.

FIG. 11 is a schematic illustration of a further graphical representation of a search window according to the present invention.

DETAILED DESCRIPTION OF THE INVENTION

Figure 1:
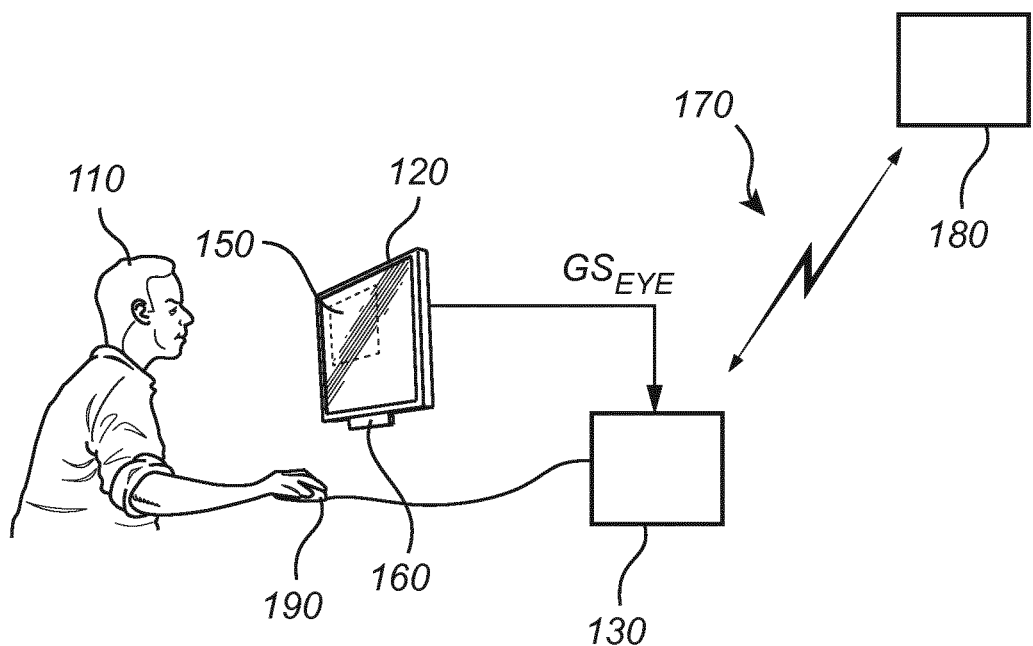
FIG. 1 is a schematic illustration of an environment including a gaze tracking module in which the present invention may be implemented.

In the context of the present application, the term "gaze search parameter" is defined as a certain parameter extracted from or determined from information on what has been presented to at least one user on at least one information display and gaze data signals from the at least one user. For example, a gaze search term may be "sentences that have been read" or "images that the user has looked at for at least a certain period of time". Each gaze search parameter may further be linked to information presented on a presentation area associated with a computer device, such as, documents (e.g. web pages, Portable Document Format (PDF) documents, text files, or word processing documents), part of documents (e.g. sentences, or a specific article), audio files, video files, or images that fulfils certain "gaze filter criteria" (e.g. a dwell time of 5 seconds), in "a gaze search index". That is, the gaze search parameter "images that the user has looked at for at least a certain period of time" may be linked to all images the user has looked at for at least 5 seconds.

Hence, in the context of the present application, the term "gaze filter criteria" is defined as requirements presented information has to satisfy or fulfil in order to be associated with or linked to a certain gaze search parameter.

Further, in the context of the present invention, the term "gaze data signal" is defined to include, for example, information on the user's gaze points on the information presentation area and/or relatively the information presentation area, information on the position of one or multiple eyes in front of the information presentation area, the blink frequency or duration of blinks and/or the pupil size of the eyes and/or eyelid closure.

In the context of the present application, the term "non gaze search parameter" refers to a search parameter that can be selected by a user for searching locally, on the computer device, or on the web using a search module (or search engine) to search a "non gaze search index". A well-known web search module is Google™ Search or Google™ Web Search owned by Google Inc. The non gaze search parameters do not contain any gaze information of the users related to, for example, which part on a web page a user has looked at for a certain period of time. Non-exhaustive examples of non gaze search parameters include, for example, academic publications, maps, patents, images as well as search terms such as, for example, "high pressure" or "ice hockey". In the non gaze search index, web pages as well as other file types including PDF, Word documents, Excel spreadsheets, Flash SWF, plain text files, parts of documents (e.g. sentences, or a specific article), audio files, video files are indexed to enable a more efficient search. Users can customize the search engine searching in the non gaze search index using the non gaze search parameters. The definition and design of the non gaze search parameters and non gaze search index is not subject of the present application and is therefore not discussed herein in further detail.

As used herein, the term "module" refers to an application specific integrated circuit (ASIC), an electronic circuit, a processor (shared, dedicated, or group) and memory that execute one or more software programs, a combinational logic circuit, or other suitable components that provide the described functionality. The term "module" further refers to a specific form of software necessary to practice the methods described herein and particularly the functions described in connection with each specific "module". It is believed that the particular form of software will be determined primarily by the particular system architecture employed in the device and by the particular detection and therapy delivery methodologies employed by the device. Providing software to accomplish the described functionality in the context of any modern medical device, given the disclosure herein, is within the abilities of the person skilled within the art.

FIG. 1 shows an overview picture of a typical user-case according to the present invention. Here, a user 110 may control a computer device 130 based on user input via input means 190 such as a mouse or a touch screen. Further, gaze data signals $GS_{EYE}$, which inter alia describes the user's gaze points on an information presentation area 120 and/or relatively the information presentation area 120, for example, a display and include eye information such as information of a position of one of multiple eyes in front of the information presentation area 120 and pupil size, are continuously collected by a gaze tracking module 160 associated with the information presentation area 120 or computer device 130. The gaze data signals $GS_{EYE}$ may also be used for controlling the computer device, for example, in combination with user input via the input means 190.

The user may thus generate gaze data signals to the computer device 130 by watching objects 150 presented on the presentation area 120 such as documents (e.g. web pages, Portable Document Format (PDF) documents, text files, or word processing documents), audio files, video files, or images. The gaze data signals $GS_{EYE}$ may result in events, related to any task performable by the computer device 130. It should be noted that according to the present invention, any type of computer device screen or monitor, as well as combinations of two or more separate displays may represent the display 120. For example, the display 120 may constitute a pair of stereoscopic screens, a heads-up display (HUD), a head-mounted display (HMD) and presentation means for a virtual environment such as the eyepieces of a pair of 3D-glasses or a room where the walls include projections screens for presenting virtual environment.

In order to produce the gaze data signals $GS_{EYE}$, the computer device 130 is associated with, or includes, the gaze tracking module 160. This module is not a subject of the present patent application and therefore it will not be described in detail herein. However, one example system for detecting eyes and gaze angles/directions and for determining gaze data is described in the U.S. Pat. No. 7,572,008 to Elvesjo et al. This system includes a photo-sensor such as a CCD-unit or CMOS-unit provided with an optical system or a video camera, one or more light sources and a calculation and control unit.

The computer device 130 may be a desktop computer, a laptop computer, a smart TV, a personal digital assistant (PDA), a web enabled mobile telephone, a tablet, a mobile internet device, a thin client, and like, that is connected, through one or more networks 170, to one or more information hosts 180. For example, a server, connected to the Internet, and hosting a website, can be an information host storing and serving information of an information space, where the information can include documents including textual content that a user can access using a computer device connected to the Internet. The networks include local area networks (LANs), wide area networks (WANs), wireless (e.g. Wi-Fi) networks, mobile phone networks, the Internet and the like.

The present invention allows the user 110 to search for information on the information hosts 180 and/or locally on the computer device 130 as will be described below.

At the lowest level, gaze data signals are interpreted to identify elementary features. Gaze data signals can be, for example, two-dimensional (x,y) eye gaze positions, three-dimensional (x,y,z) gaze positions, eye position in space (X',Y',Z'), sample time (t), pupil diameter (d), (optionally), whether the eye is open or closed, and other related information such as biofeedback (e.g., sweat, temperature, heart rate, breathing rate) information. Elementary features that are determined from the gaze data signals can be, for example, fixations (position, time and/or duration), saccades (magnitude, direction and/or velocity), smooth pursuit motion (path taken by eye, velocity), blinks (duration), pupil response.

Figure 2:
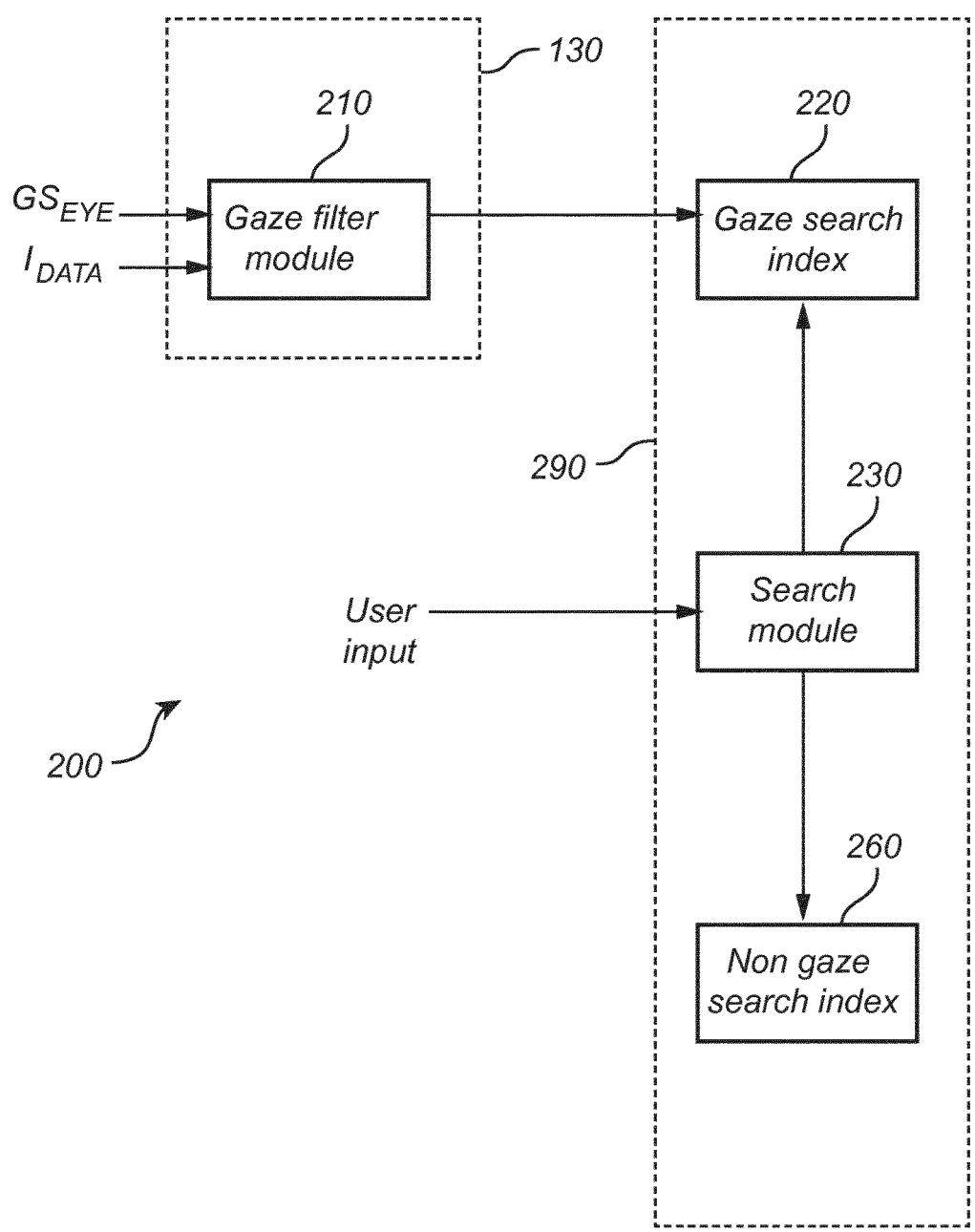
FIG. 2 is a schematic illustration of an embodiment of a system for searching information as a result of user initiated search queries in accordance with the present invention.
Figure 3:
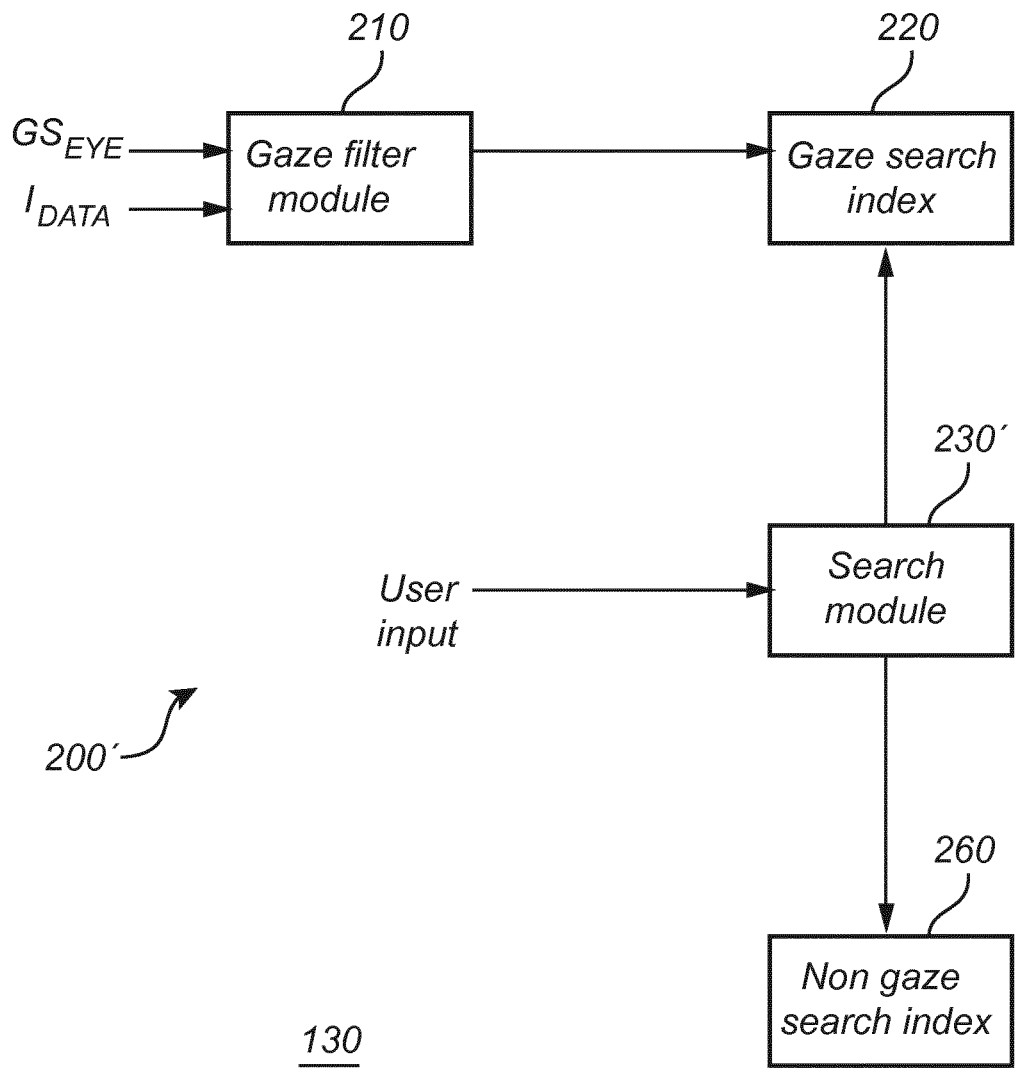
FIG. 3 is a schematic illustration of another embodiment of a system for searching information as a result of user initiated search queries in accordance with the present invention.
Figure 4:
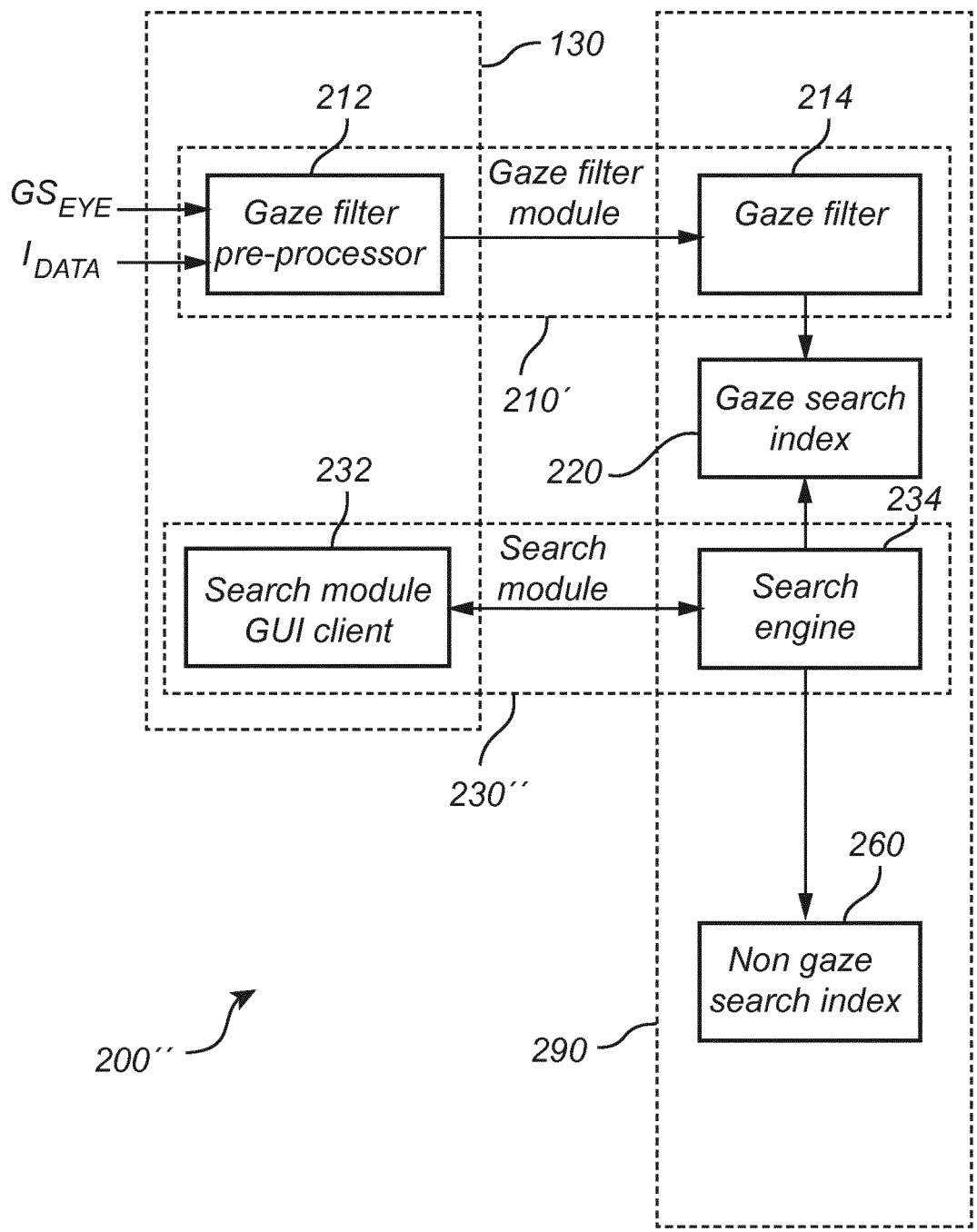
FIG. 4 is a schematic illustration of a further embodiment of system for searching information as a result of user initiated search queries in accordance with the present invention.

With reference now to FIGS. 2-4, a system for searching information using the computer device 130 according to the present invention will be discussed in more detail. The system 200 for searching information may be integrated in the computer device 130 or may be arranged as unit connectable to the computer device 130, or located on the computer device and a remote server.

In the embodiment of the system 200 illustrated in FIG. 2, the gaze filter module 210 is implemented on the computer device 130. The search module 230 is implemented on at least one remote server unit 290. The gaze search index 220 is stored on the at least one remote server 290. A search module 230, for example, Google™ Search or Google™ Web Search owned by Google Inc. and a non gaze search index 260 may be located on the at least one remote servers 290.

In an alternative embodiment of the system 200', the gaze filter module 210, the gaze search index, the search module 230' and the non gaze search index is implemented locally on the computer device 130, which is shown in FIG. 3.

As the skilled person realizes, there are other conceivable solutions within the scope of the present invention. For example, as shown in FIG. 4, the system 200" includes a distributed gaze filter module 210' including a gaze filter pre-processor 212 arranged on the computer device 130 and a gaze filter 214 arranged on the at least one remote server 290. The search module 230" may also be distributed and a search module GUI client 232 allowing the user to define search queries is arranged on the computer device 130 and a search engine 234 is arranged on the at least one remote server 290. The gaze search index 220 and the non gaze search index 260 are stored on the at least one remote server 290.

Figure 9:
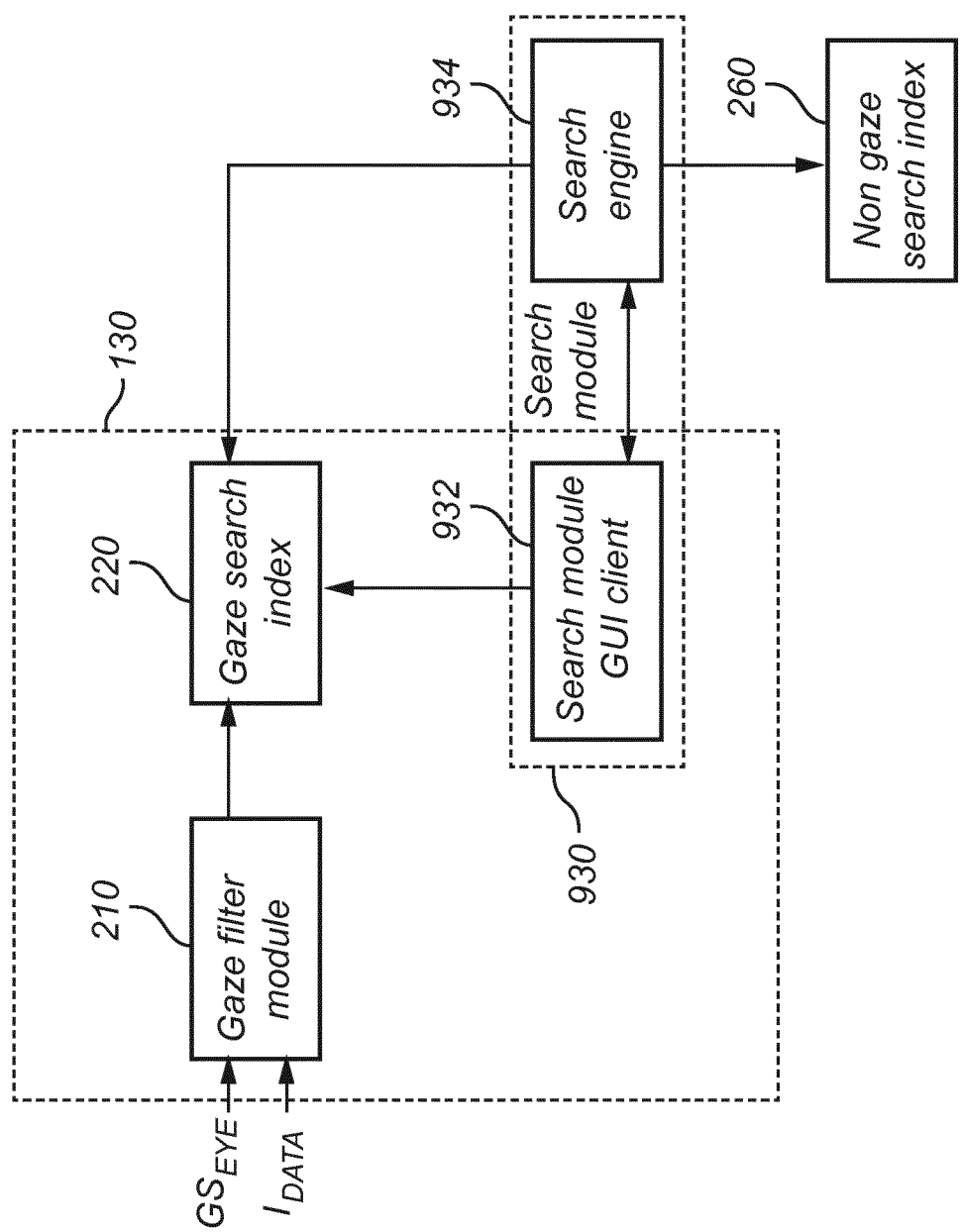
FIG. 9 is a schematic illustration of a further embodiment of system for searching information as a result of user initiated search queries in accordance with the present invention.

In yet another example shown in FIG. 9, the gaze filter module 210 and the gaze search index 220 are implemented locally on the computer device 130. The search module 930 may be distributed and the search module GUI client 932 allowing the user to define search queries is arranged on the computer device 130 and the search engine 934 is arranged on the at least one remote server 290 together with non gaze search index 260.

The gaze filter module 210, 210', is configured to apply one or more filters to extract or determine gaze search parameters based on the gaze data signals $GS_{EYE}$ and information of data $I_{DATA}$ that has been presented on the presentation area 120.

The gaze filter module 210, 210', analyses the gaze data signals $GS_{EYE}$ and information of data $I_{DATA}$ that has been presented on the presentation area 120 using gaze data filters having gaze criteria to produce a gaze search index containing links between gaze search parameters and data that fulfils the gaze criteria. The gaze filter module 210, 210' may analyze the gaze data signals $GS_{EYE}$ and information of data $I_{DATA}$ that has been presented on the presentation area 120 in real-time or based on historic, i.e. stored, gaze data signals $GS_{EYE}$ and information of data $I_{DATA}$ that has been presented on the presentation area 120.

A non-exhaustive list of such gaze search parameters include:
  Presented information that the user has looked at for at least a certain period of time (e.g. 3, 4, 5, or 6 seconds);
  Presented information that the user has looked at during a period of time while being distracted;
  Presented information that has caused strong emotional reaction of the user;
  Presented information that the user has focused on;
  Articles that the user has read at least a predetermined amount (e.g. 45%, 50%, 55% or 60%) of the included text;
  Articles or texts that have been thoroughly read by the user;
  Articles or texts that have been skimmed by the user;
  Articles user and/or articles or texts the user read while being tired.

The gaze search parameters mentioned above is thus a non-exhaustive list and there are a number of other gaze search parameters that are conceivable.

The gaze tracking module 160 is a measurement tool. Thus, the measured gaze position of a user on an information presentation area in principle always includes a spatial measurement error. Accordingly, it may be a difference between the measured raw gaze position on the information presentation area and the real spot on the information presentation area where the person actually is looking. Therefore, when referring to where someone has looked, this uncertainty should be considered and generally some kind of intelligent filtering of the gaze data in combination with the data shown on the screen is required to define what the person actually looked at. This filtering is also included in the gaze filter module 210, 210'. However, this filtering is not a subject of the present invention and is therefore not discussed in more detail.

The search module 230, 230', 230" is configured to execute user initiated query searches in the gaze search index 220 and the non gaze search index 260.

The gaze search index 220 is created by the gaze filter module 210, 210', and is continuously updated with new gaze data signals $GS_{EYE}$ and new information of data $I_{DATA}$ that has been presented on the presentation area 120. The gaze search index 220 may be stored locally on the computer device 130 (FIG. 3) or on the at least one remote server 290 (FIGS. 2 and 4).

A user can, by using the present invention, search and find information on information hosts 180 as well as on the computer device 130 by search in the gaze search index 220 and the non gaze search index 260 based on a search query including both gaze search parameters and non gaze search parameters. Generally, the information or data that can be found using the gaze search parameters and non gaze search parameters include documents (e.g. web pages, Portable Document Format (PDF) documents, text files, or word processing documents), audio files, video files, images and the like stored in one or more information hosts and are accessible to a search module. The information is normally addressable by URIs (Uniform Resource Identifiers) and/or URLs (Uniform Resource Locators) on the Internet and the information space (e.g. web pages are added, updated, changed or removed) is dynamic and may change even while a search for information is performed.

Hence, the searchable indices include the gaze search index 220 consisting of gaze parameters extracted or determined from the gaze data and the non gaze search index 260 based on non gaze search parameters. The search module 230, 230', 230" according to the present invention has access to both these indices and can perform user initiated and user defined searches in both these indices using combinations of gaze search parameters and non gaze search parameters.

As described above, the user 110 can access the content of the information space in the information hosts 180 using a client device, e.g. the computer device 130, which may be any kind of user device including desktop computer, a laptop computer, a smart TV, a personal digital assistant (PDA), a web enabled mobile telephone, a tablet, a mobile internet device, a thin client, and like, that is connected, through one or more networks, to the information hosts 180.

In embodiments of the present invention, the search module 230, 230', 230", 930 may be configured to also, or alternatively, search for information in a desktop file system on the computer device 130.

Preferably, the search module 230, 230'. 230", 930 is represented by a graphical representation such as a GUI component on the display 120 enabling the user 110 to, for example, define, customize and initiate query searches for information via, for example, input means 190 such as a mouse, via a touch screen, via gestures interpreted by gesture interpretation means or via gaze data signals created by the gaze tracking module 160. According to one embodiment of the present invention, a search module GUI client 232 is arranged on the computer device 130.

The user is enabled to customize the search query in a number of different ways and below a few non-exhaustive examples will be discussed with reference to FIGS. 5 and 6. As one example, non gaze search parameters may be added to the gaze search parameters to restrict or narrow a search. For example, presented data that the user has looked at for at least a certain period of time may be limited by adding a non gaze parameter "only images" or "only text". Thereby, only images that the user has looked at for at least the certain period of time or only texts that the user has looked at for at least the certain period of time are included in the search instead of both texts and images fulfilling the gaze filter criteria, i.e. a dwell time of at least the certain period of time.

Moreover, data can also be excluded from a specific set of gaze search parameters (e.g. by defining that a term is not to be included).

An example of an implementation of a search for content may be as shown in FIG. 5. The search module 230, 230', 230", 930 may in this regard be configured to display, for example, on the information presentation area 120, a search window 300 including a column for search parameters 305, which in this illustrative example, comprises gaze search parameters 310a-310d and non gaze search parameters 310e-310f and buttons 311, 312 for providing selection possibilities for the user. The user 110 may for, each search parameter, choose whether to include or exclude a specific search parameter. In the illustrated case in FIG. 5, the user has defined a search including the gaze search parameters "text that has been thoroughly read", "text that has been skimmed", and the non gaze search parameters "space" and "satellite". The gaze search terms "text that was read while being distracted" and "text that caused strong emotional reaction" are excluded in this search.

Figure 6:
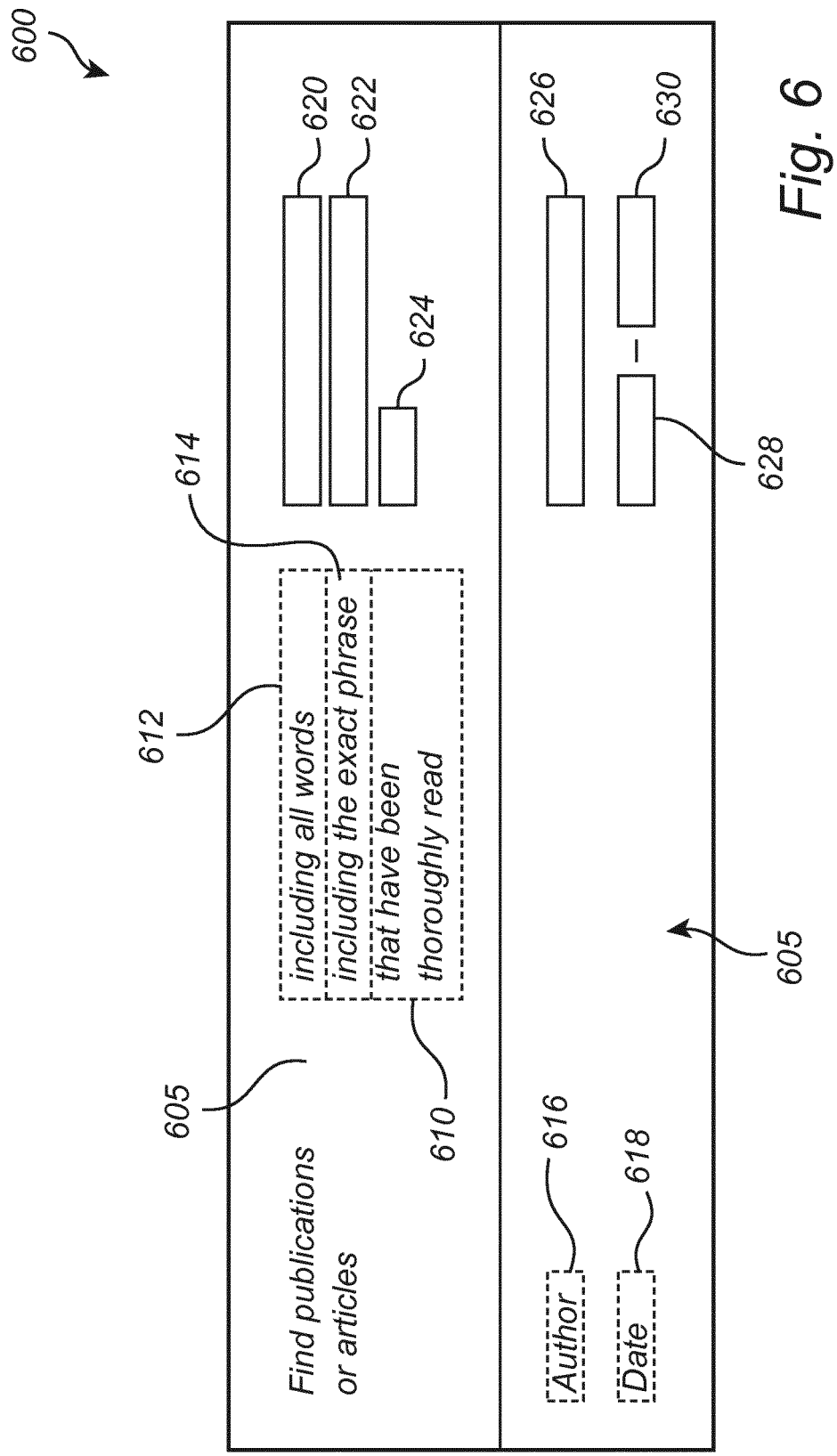
FIG. 6 is a schematic illustration of another graphical representation of a search window according to the present invention.

Referring to FIG. 6 another example of a search window allowing the user 110 to define a query for articles and publications will be discussed. The search module 230, 230', 230", 930 may in this regard be configured to display, for example, on the information presentation area 120, a search window 600 including search parameters 605, which in this illustrative example, comprises a gaze search parameters 610 and non gaze search parameters 612-618 and fields 620-630 for providing possibilities for the user 110 to enter search terms and for selecting whether to include the gaze search parameter "publication or articles that have been thoroughly read by the user" in the search.

Figure 10:
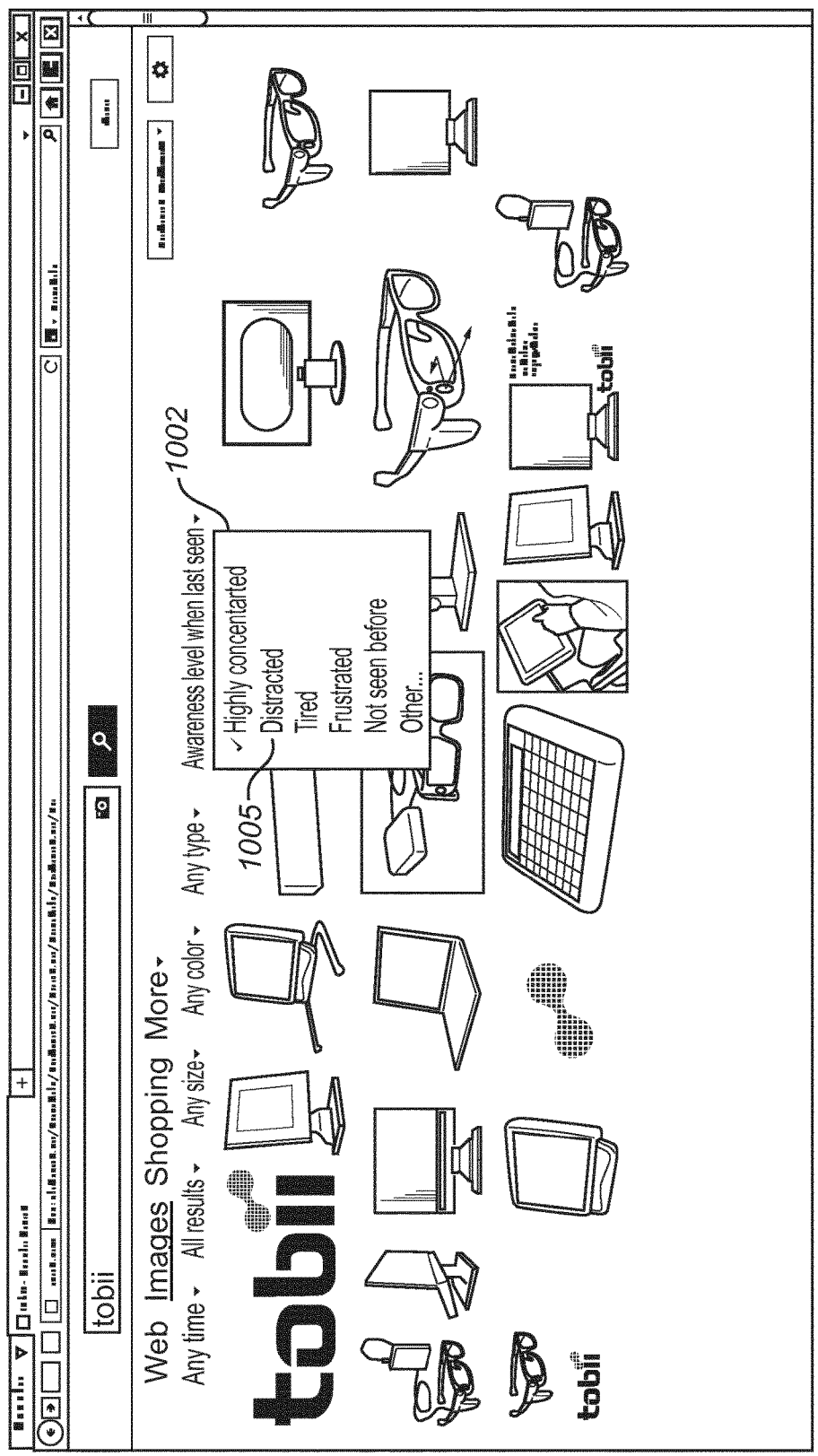
FIG. 10 is a schematic illustration of another graphical representation of a search window according to the present invention.

With reference to FIG. 10, a further example of a search window allowing the user to define a query for images will be discussed. The search module GUI client 232, 932 (see FIGS. 4 and 9) may in this regard be configured to display on the information presentation area 120, a search window 1000 including at least one area 1002 comprising gaze search parameters 1005 corresponding to different awareness levels or mental conditions of the user. In this embodiment, the area "Awareness level when last seen", e.g. a "drop down menu", allows the user to define a search or query including only results or images that he or she previously gazed at while in a specific mental condition. In the illustrated example, the conditions that the user may select between include (non exhaustive):
  a) Highly concentrated
  b) Distracted
  c) Tired
  d) Frustrated
  e) Images that the user has not seen
  f) Other: may include further options. The user may be allowed to define or customize conditions.

This illustrated embodiment also includes a number of areas or fields allowing the user to define or limit the query by in addition to gaze search parameters using also non gaze search parameters.

With reference to FIG. 11, yet another example of a search window allowing the user to define a query for web pages, articles and publications will be discussed. The search module GUI client 232, 932 may in this regard be configured to display on the information presentation area 120, a search window 1100 including at least one area 1102 comprising gaze search parameters 1105 corresponding to different awareness levels or mental conditions of the user. In this embodiment, the area "Awareness" allows the user to define a search or query including only results or pages that he or she previously gazed at while in a specific mental condition. In the illustrated example, the user may select any of the conditions or alternatives (non exhaustive):
  a) Highly concentrated
  b) Distracted
  c) Tired
  d) Frustrated
  e) Images that the user has not seen
  f) Other: may include further options. The user may be allowed to define or customize conditions.

This illustrated embodiment also includes a number of areas or fields allowing the user to further define the query by also using non gaze search parameters.

Figure 12:
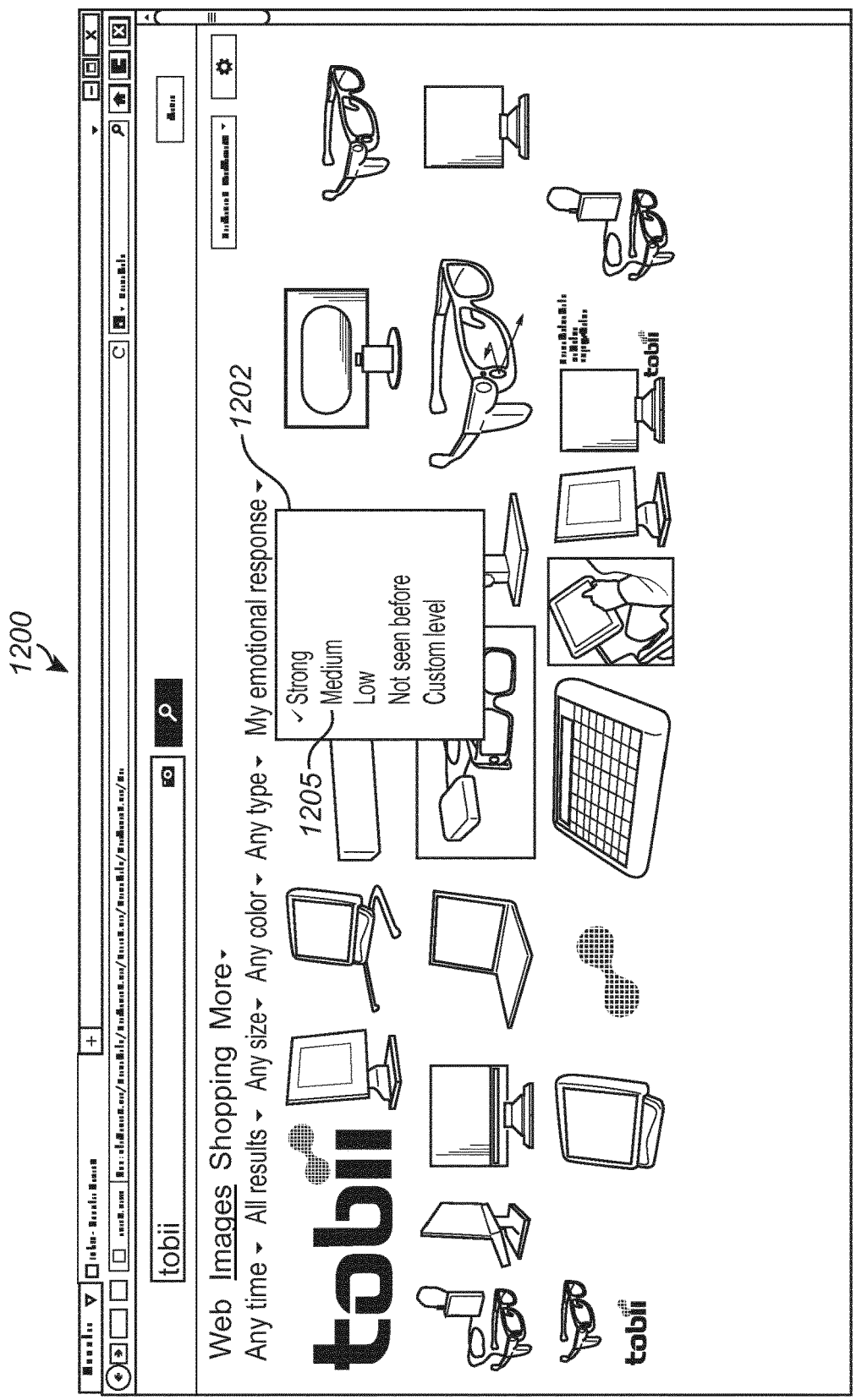
FIG. 12 is a schematic illustration of yet another graphical representation of a search window according to the present invention.

With reference to FIG. 12, another example of a search window allowing the user to define a query for images will be discussed. The search module GUI client 232, 932 may in this regard be configured to display on the information presentation area 120, a search window 1200 including at least one area 1202 comprising gaze search parameters 1205 corresponding to emotional response of, for example, a certain image or page. These gaze search parameters reflect the emotional response of the user to previously presented images or information. For example, pupil dilation or gaze pattern of the user can be gathered to evaluate and determine the emotional response. In this embodiment, the area "my emotional response", e.g. a "drop down menu", allows the user to define a search query including only results or images that resulted in a specific level of emotional response last time he or she saw it. In the illustrated embodiment, the user may select between the following responses (non exhaustive):

Strong,
Medium,
Low
Images not seen before
Custom level—allows the user to customize the levels.

This illustrated embodiment also includes a number of areas or fields allowing the user to define the query by using also non gaze search parameters.

Figure 13:
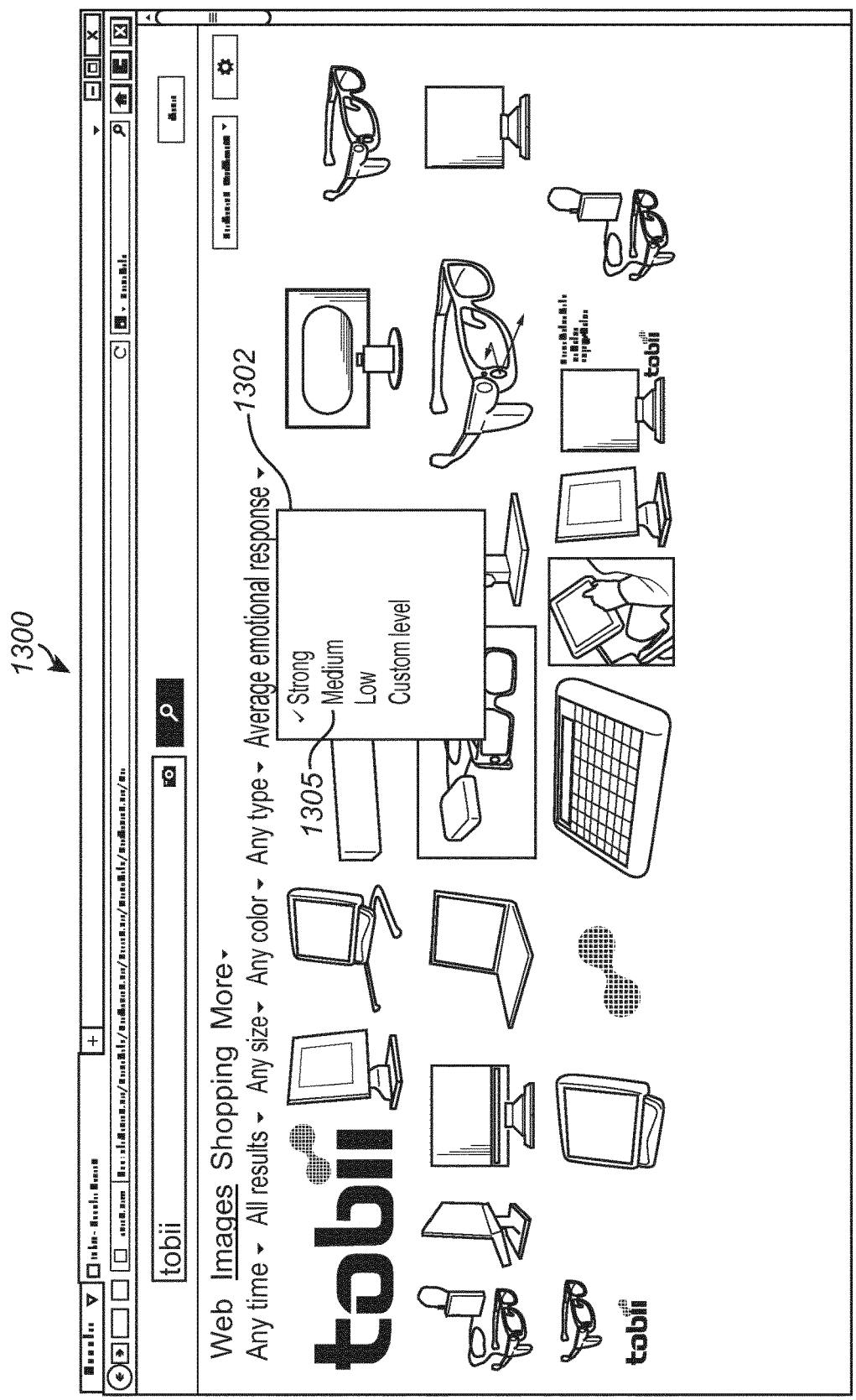
FIG. 13 is a schematic illustration of still another graphical representation of a search window according to the present invention.

With reference to FIG. 13, another example of a search window allowing the user to define a query for images will be discussed. In this embodiment, images can be searched for those have given rise to a certain degree of average emotional response of a number of users. Hence, the gaze data constituting basis for the average emotional response is collected or gathered from multiple users (see also the embodiment of the present invention described below with reference to FIG. 8). The search module GUI client 232, 932 may in this regard be configured to display on the information presentation area 120, a search window 1300 including at least one area 1302 comprising gaze search parameters 1305 corresponding to average emotional response to, for example, a certain image or page. These gaze search parameters reflect the average emotional response of the users to previously presented images or information. For example, pupil dilation or gaze pattern of the user can be gathered to evaluate and determine the emotional response. In this embodiment, the area "Average emotional response", e.g. a "drop down menu", allows the user to define a search query including only results or images that resulted in a specific level of average emotional response. In the illustrated embodiment, the following responses can be selected by the user (non exhaustive):

Strong,
Medium,
Low
Custom level—allows the user to customize the levels.

This illustrated embodiment also includes a number of areas or fields allowing the user to select also non gaze search parameters to further define the query.

Figure 14:
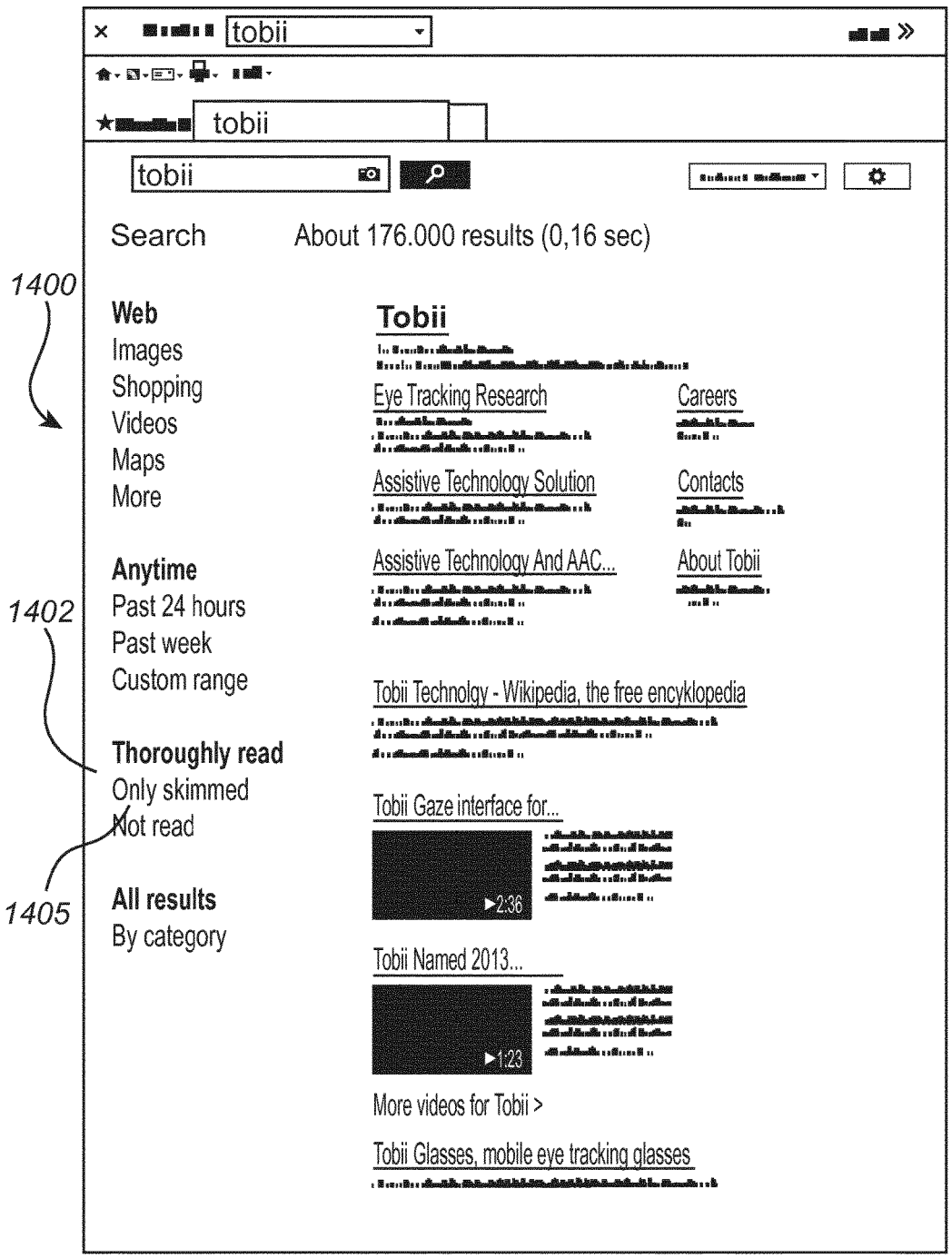
FIG. 14 is a schematic illustration of a further graphical representation of a search window according to the present invention.

With reference to FIG. 14, a further example of a search window allowing the user to define a query for web pages will be discussed. The search module GUI client 232, 932 may in this regard be configured to display on the information presentation area 120, a search window 1400 including at least one area 1402 comprising gaze search parameters 1405 corresponding to the reading pattern when reading the information, data or text. For example, the user may select between text, data or information that he or she has previously thoroughly read, only skimmed or not read at all. This illustrated embodiment also includes a number of areas or fields allowing the user to further define the query by using also non gaze search parameters.

Figure 15:
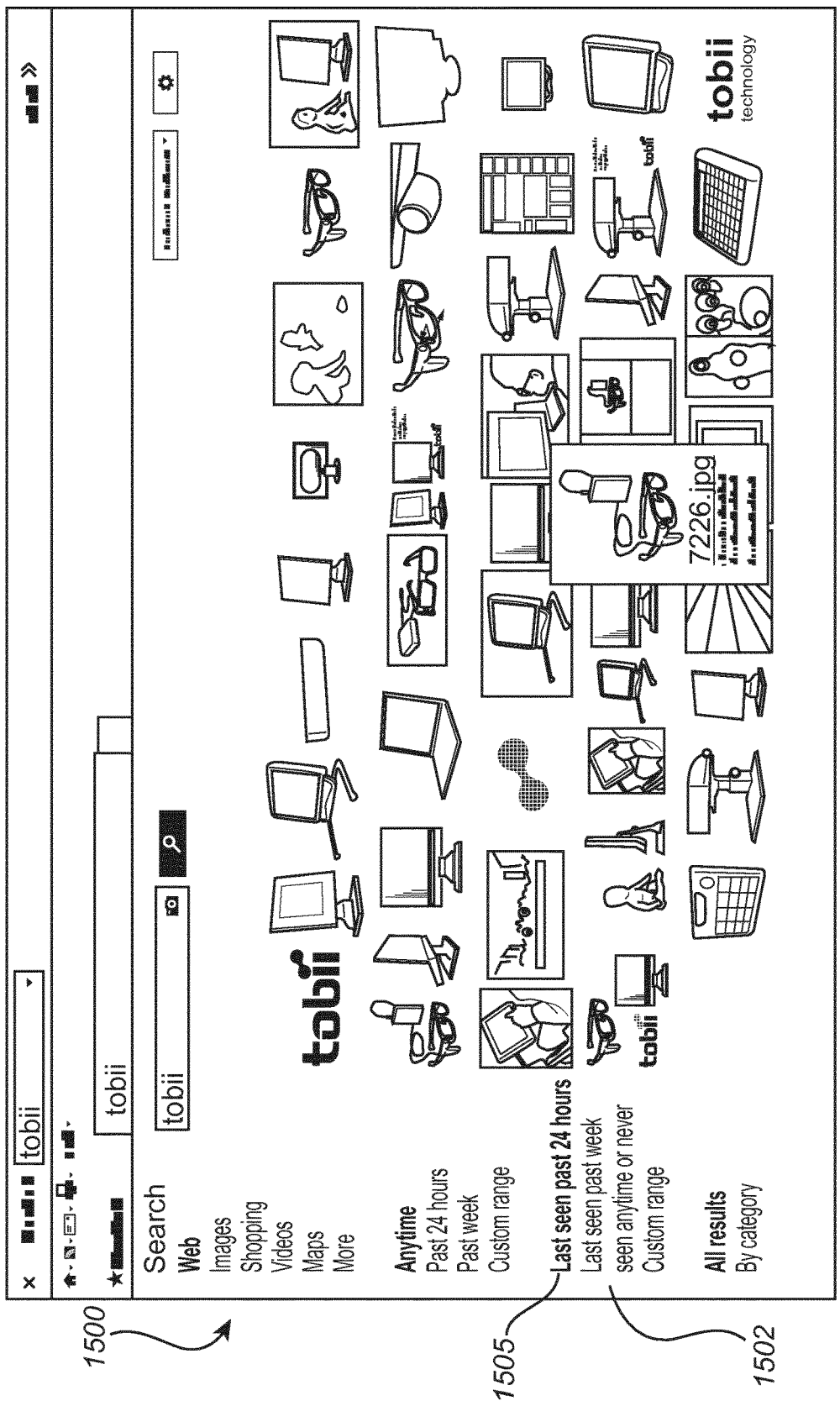
FIG. 15 is a schematic illustration of another graphical representation of a search window according to the present invention.

With reference to FIG. 15, another example of a search window allowing the user to define a query for images will be discussed. The search module GUI client 232, 932 may in this regard be configured to display on the information presentation area 120, a search window 1500 including at least one area 1502 comprising gaze search parameters 1505 corresponding to a time aspect of the viewed data or images. For example, the user may define a search or query including only results or images that he or she gazed at during the past 24 hours, the past week, seen any time or never seen. Further, the user may also be allowed to customize time ranges. This illustrated embodiment also includes a number of areas or fields allowing the user to limit or define the query by also using non gaze search parameters.

Figure 16:
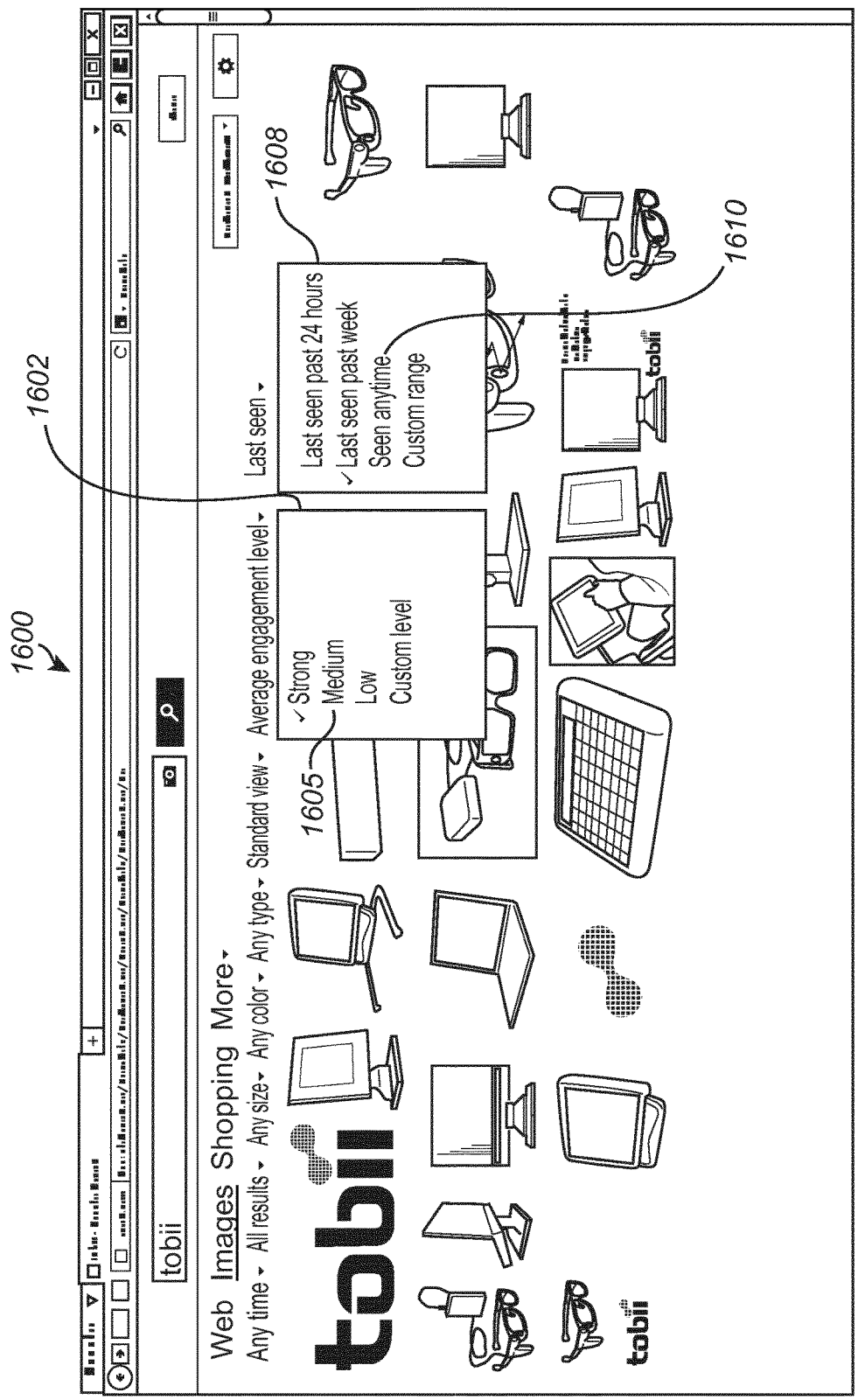
FIG. 16 is a schematic illustration of yet another graphical representation of a search window according to the present invention.

With reference to FIG. 16, a further example of a search window allowing the user to define a query for images will be discussed. In this embodiment, images can be searched for that has given rise to a certain degree of average emotional response of a number of users. Hence, the gaze data constituting basis for the average emotional response is collected or gathered from multiple users (see also the embodiment of the present invention described below with reference to FIG. 8). The search module GUI client 232, 932 may in this regard be configured to display on the information presentation area 120, a search window 1600 including a first area 1602 comprising gaze search parameters 1605 corresponding to average emotional response to, for example, a certain image or page. These gaze search parameters reflect the average emotional response of the users to previously presented images or information. For example, pupil dilation or gaze pattern of the user can be gathered to evaluate and determine the emotional response. In this embodiment, the area "Average engagement level", e.g. a "drop down menu", allows the user to define a search query including only results or images that resulted in a specific level of average engagement level. In the illustrated embodiment, the following responses can be selected by the user (non exhaustive):

Strong,
Medium,
Low
Custom level—allows the user to customize the levels.

Further, the search window 1600 includes a second area 1608 comprising gaze search parameters 1610 corresponding to a time aspect of the viewed data or images. Hence, the user may further define the search or query to include only results or images that he or she gazed at during the past 24 hours, the past week, seen any time or never seen. The user may also be allowed to customize time ranges. This illustrated embodiment also includes a number of areas or fields allowing the user to select also non gaze search parameters to further define the query.

Figure 7:
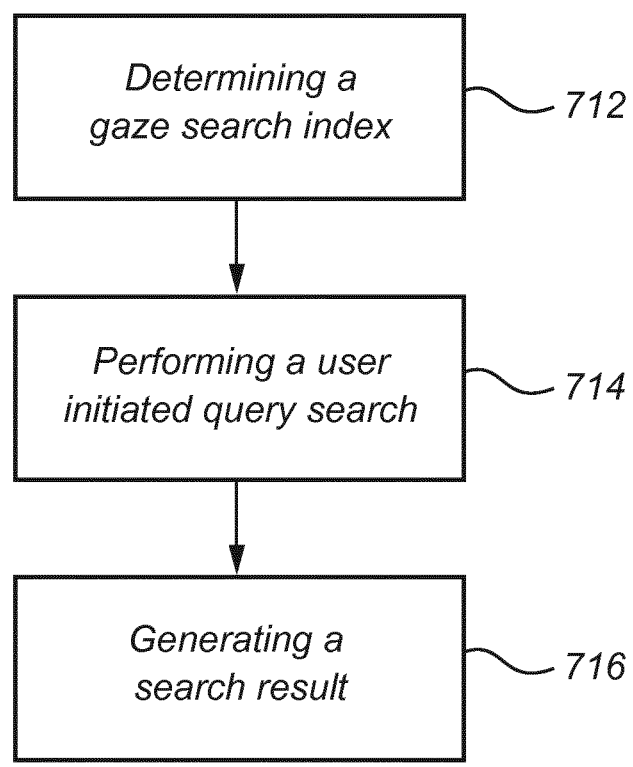
FIG. 7 is a flow chart of a process or method for searching information as a result of user initiated search queries in accordance with the present invention.

Referring now to FIG. 7, an embodiment of a process according to the present invention for providing search results in response to user initiated search queries will be discussed. The methods or processes according to the present invention are preferably executed or performed using a computer device and system disclosed in FIGS. 1-4 and described above.

The flow chart shown in FIG. 7 is intended to illustrate the functional operation of the system, and should not be construed as reflective of a specific form of software or hardware necessary to practice the methods described. It is believed that the particular form of software will be determined primarily by the particular system architecture employed in the device and by the particular detection and therapy delivery methodologies employed by the device. Providing software to accomplish the described functionality in the context of any modern computer device, given the disclosure herein, is within the abilities of the person skilled within the art.

Methods described in conjunction with flow charts presented herein may be implemented in a computer-readable medium that includes instructions for causing a programmable processor to carry out the methods described. A "computer-readable medium" includes but is not limited to any volatile or non-volatile media, such as RAM, ROM, CD-ROM, NVRAM, EEPROM, flash memory, and the like. The instructions may be implemented as one or more software modules, which may be executed by themselves or in combination with other software.

The process 400 determines a gaze search index based on information $I_{DATA}$ that has been presented on the information presentation area 120 and gaze data signals $GS_{EYE}$ (step 712) as has been described above. The gaze search index may preferably be updated regularly.

At step 714, a user initiated query search for information on the computer device 130 and/or on information hosts 180 operatively coupled to the computer device 130 via networks 170 is performed based on a user defined query including gaze search parameters and non gaze search parameters. For example, the user 110 may enter a search term or combination of search terms via a graphical representation of the search module 230, 230', 230", 930 as described above in connection with FIGS. 5 and 6.

At step 716, a search result is generated, which may include information such as web pages of web sites or documents or URIs and/or URLs that are addresses of the information or both.

According to the present invention, the search module 230, 230', 230", 930 is configured to display or present the search result as a graphical representation or search result presentation window on the information presentation area 120. In embodiments of the present invention, the search module GUI client 232, 932 is configured to display or present the search result as a graphical representation or search result presentation window on the information presentation area 120. In other embodiments of the present invention, the search engine 234, 934 is configured to display or present the search result as a graphical representation or search result presentation window on the information presentation area 120.

Figure 8:
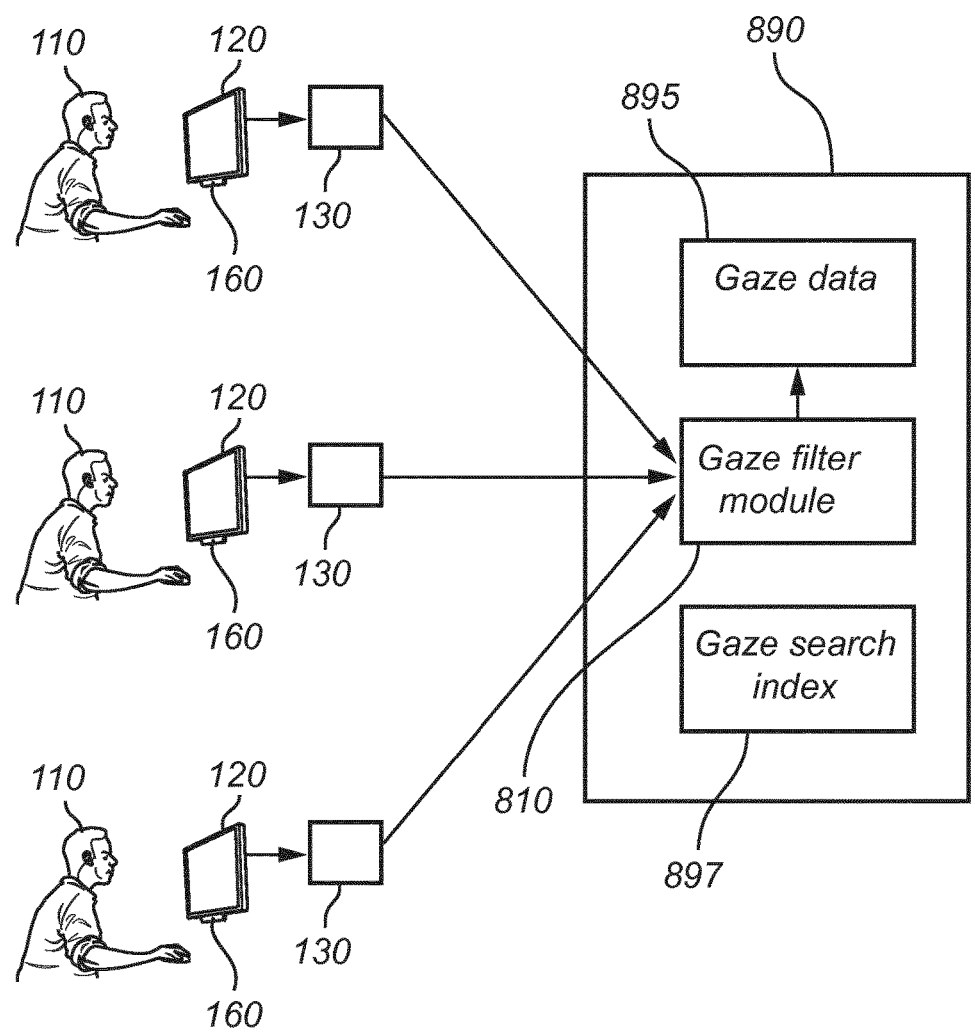
FIG. 8 is schematic illustration of yet another embodiment of the present invention.

According to embodiments of the present invention, gaze data signals $GS_{EYE}$ from several users 110 are collected and analysed by a gaze filter module 810 located on at least one remote server 890 as shown in FIG. 8. Thereby, it is possible to obtain aggregated gaze data or information 895 that reflects general user behaviour including, for example, user response to advertisements or to web page designs. It is also possible to gather aggregated gaze search parameters and to create a gaze search index 897 based on aggregated data.

While this specification contains a number of specific embodiments, these should not be construed as limitation to the scope of the present invention or of what may be claimed, but rather as descriptions of features specific to exemplary implementations of the present invention. Certain features that are described in this specification in the context of separate implementations can also be implemented in combinations in a single implementation. Conversely, various features that are described in the context of a single implementation can also be implemented in multiple implementations separately or in any suitable sub-combination. Moreover, although feature may be described above as acting in certain combinations or even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as require such operations be performed in the particular order shown or in sequential order, or that all illustrated operation be performed to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

The invention claimed is:

1. A method for searching information using a computer device associated with an information presentation area, the method comprising:
   displaying, on the information presentation area, a search window comprising at least one field for presenting search parameters including gaze search parameters and non gaze search parameters for a user, the gaze search parameters:
      representing a predefined set of specific mental conditions experienced by the user when the user viewed presented information during a certain period of time prior to displaying the search window; and
      being based on at least one of a duration of blinks and a pupil size of the user measured during the certain period of time when the user viewed the presented information;
   displaying the gaze search parameters as selectable posts in the search window, the set of selectable posts comprising a set of labels corresponding to the predefined set of specific mental conditions; and
   executing a query search on the computer device or on information hosts connectable to the computer device via networks, by using a selected combination of at least one of the gaze search parameters and at least one of the non gaze search parameters.

2. The method for searching information using a computer device according to claim 1, further comprising:
   creating the gaze search parameters based on information that has been presented on the information presentation area for the user and gaze data signals connected with the presented information provided from a gaze tracking module associated with the computer device.

3. The method for searching information using a computer device according to claim 1, further comprising:
   creating the gaze search parameters based on information that has been presented for the user on information presentation areas, each being associated with a computer device, and gaze data signals connected with the presented information provided from gaze tracking modules associated with the computer devices.

4. The method for searching information using a computer device according to claim 1, further comprising:
   creating the gaze search parameters based on information that has been presented on multiple information presentation areas, each being associated with a computer device, for multiple users and gaze data signals connected with the presented information provided from gaze tracking modules associated with the computer devices.

5. The method for searching information using a computer device according to claim 1, further comprising:
   displaying a search result presentation window on the information presentation area presenting a search result from the query search.

6. The method for searching information using a computer device according to claim 1, further comprising:
   extracting the gaze search parameters based on gaze tracking data and information of data that has been presented on the information presentation area using one or more gaze search parameter filters.

7. The method for searching information using a computer device according to claim 1, wherein the gaze search parameters comprise at least one of the following:
   presented information that the user has looked at for at least a certain period of time; and/or
   presented information that the user has looked at during a period of time while being distracted; and/or
   presented information that has caused strong emotional reaction of the user; and/or
   presented information that the user has focused on; and/or
   articles that the user has read at least a predetermined amount of the included text; and/or
   articles or texts that have been thoroughly read by the user; and/or
   articles or texts that have been skimmed by the user; and/or
   articles or texts the user read while being tired.

8. The method for searching information using a computer device according to claim 1, further comprising analyzing at least one set of previous gaze search parameters to determine a behavioral pattern, wherein the behavioral pattern can be used to organize and/or prioritize search results.

9. The method for searching information using a computer device according to claim 1, further comprising presenting a graphical representation on said information presentation area, wherein said graphical representation enables user input for customizing the query search in accordance with user preferences including defining a time criteria as a gaze search parameter.

10. The method for searching information using a computer device according to claim 1, wherein the computer device is one of a plurality of computer devices each of which being associated with a gaze tracking module configured to provide gaze data signals and an information presentation area for presenting data, wherein said method further comprises collecting raw or pre-processed gaze data signals and information on data shown on the information presentation areas from the computer devices and providing a set of aggregated gaze search parameters based on the gaze data signals and the data presented on the information presentation areas.

11. The method for searching information using a computer device according to claim 1, further comprising displaying a search window on the presentation area comprising at least one field for presenting the gaze search parameters reflecting a reading pattern of the user when reading presented information, the gaze search parameters allowing the user to define a specific query search by selecting whether to include or exclude a specific gaze search parameter in the specific query search.

12. The method for searching information using a computer device according to claim 1, further comprising displaying a search window on the presentation area comprising at least one field for presenting the gaze search parameters reflecting a period of time when the user viewed data, the gaze search parameters allowing the user to define a specific query search by selecting whether to include or exclude a specific gaze search parameter in the specific query search.

13. The method for searching information using a computer device according to claim 1, wherein displaying the search window on the information presentation area comprises displaying the search window on the information presentation area of a head-mounted display worn by the user.

14. The method for searching information using a computer device according to claim 1, wherein displaying the search parameters as selectable posts in the search window further comprises:
   displaying the gaze search parameters as first set of selectable posts in the search window; and
   displaying the non gaze search parameters as a second set of selectable posts in the search window.

15. The method for searching information using a computer device according to claim 14, wherein the selected combination is selected by:
   receiving a first user selection of a first label of the set of labels, the first label being of a first selectable post of the set of selectable posts, and the first selectable post corresponding to the at least one gaze search parameter; and
   receiving a second user selection of a second selectable post from the second set of selectable posts, the second selectable post corresponding to the at least one non gaze search parameter.

16. A search module for information searches using a computer device associated with an information presentation area, wherein said search module comprises:
   a search module GUI client configured to:
      display a search window on the presentation area, the search window comprising at least one field for:
         presenting search parameters including gaze search parameters and non gaze search parameters for a user, the gaze search parameters:
            representing a predefined set of specific mental conditions experienced by the user when the user viewed presented information during a certain period of time prior to displaying the search window; and
            being based on at least one of a duration of blinks and a pupil size of the user measured during the certain period of time when the user viewed the presented information; and
         displaying the gaze search parameters as selectable posts in the search window, the selectable posts comprising labels corresponding to the predefined set of specific mental conditions; and
      provide signals corresponding to specific query searches to a search engine for execution of the specific query searches on the computer device and/or on information hosts connectable to the computer device via networks, by using a selected combination of at least one of the gaze search parameters and at least one of the non gaze search parameters.

17. The search module according to claim 16, wherein the gaze search parameters are created based on information that has been presented on the information presentation area for the user and gaze data signals connected with the presented information provided from a gaze tracking module associated with the computer device.

18. The search module according to claim 16, wherein the gaze search parameters are created based on information that has been presented for the user on information presentation areas, each being associated with a different computer device, and gaze data signals connected with the presented information provided from gaze tracking modules associated with the different computer devices.

19. The search module according to claim 16, wherein the gaze search parameters are created based on information that has been presented on multiple information presentation areas, each being associated with a different computer device, for multiple users and gaze data signals connected with the presented information provided from multiple gaze tracking modules associated with the different computer devices.

20. The search module according to claim 16, wherein the search module GUI client is further configured to display a search result presentation window on the information presentation area presenting a search result from the query search.

21. The search module according to claim 16, wherein the gaze search parameters reflect a reading pattern of the user when reading the presented information, the gaze search parameters allowing the user to define a specific query search by selecting whether to include or exclude a specific gaze search parameter in the specific query search.

22. The search module according to claim 16, wherein the gaze search parameters reflect a period of time when the user viewed an image, the gaze search parameters allowing the user to define a specific query search by selecting whether to include or exclude a specific gaze search parameter in the specific query search.

23. A system for searching information using a computer device associated with an information presentation area and a gaze tracking module, the system comprising:
 a search module GUI client configured to:
  display a search window on the information presentation area, the search window comprising at least one area for:
   presenting search parameters including gaze search parameters and non gaze search parameters for a user, the gaze search parameters:
    representing a predefined set of specific mental conditions experienced by the user when the user viewed presented information during a certain period of time prior to displaying the search window; and
    being based on at least one of a duration of blinks and a pupil size of the user measured during the certain period of time when the user viewed the presented information; and
   displaying the search gaze parameters as selectable posts in the search window, the selectable posts comprising labels corresponding to the predefined set of specific mental conditions; and
  provide signals corresponding to a specific query search to a search engine for execution of the specific query search on the computer device and/or on information hosts connectable to the computer device via networks, by using a selected combination of at least one of the gaze search parameters and at least one of the non gaze search parameters.

24. The system according to claim 23, further comprising a gaze filter module configured to determine the gaze search parameters based on information that has been presented and gaze data signals, the gaze search parameters comprising links between the gaze search parameters and presented information that satisfies gaze filter criteria for the respective gaze search parameter.

25. The system according to claim 24 wherein the gaze filter module is configured to create the gaze search parameters based on information that has been presented on the information presentation area for the user and gaze data signals connected with the presented information provided from the gaze tracking module associated with the computer device.

26. The system for searching information using a computer device according to claim 24, wherein the gaze filter module is configured to create, maintain and update a gaze search index based on gaze data signals and information of data that has been presented on the information presentation area using the gaze filter criteria.

27. The system according to claim 24, wherein the gaze filter module is further configured to analyze at least one gaze search index to determine a behavioral pattern, the behavioral pattern usable to organize and/or prioritize search results.

28. The system according to claim 23, wherein the search module GUI client is further configured to display a search result presentation window on the information presentation area presenting a search result from the specific query search.

29. The system for searching information using a computer device according to claim 23, wherein the gaze search parameters comprise:
 presented information that the user has looked at for at least a certain period of time; and/or
 presented information that the user has looked at during a period of time while being distracted; and/or
 presented information that has caused strong emotional reaction of the user; and/or
 presented information that the user has focused on; and/or
 articles that the user has read at least a predetermined amount of the included text; and/or
 articles or texts that have been thoroughly read by the user; and/or
 articles or texts that have been skimmed by the user; and/or
 articles or texts the user read while being tired.

30. The system according to claim 23, wherein the search window on the information presentation area comprises at least one field for presenting specific gaze search parameters reflecting a reading pattern of the user when reading the presented information, the specific search parameters allowing the user to define a different specific query search by selecting whether to include or exclude the specific gaze search parameters in the different specific query search.

31. The system according to claim 23, wherein the search window on the information presentation area comprises at least one field for presenting specific gaze search parameters reflecting a period of time when the user viewed an image, the specific gaze search parameters allowing the user to define a different specific query search by selecting whether to include or exclude the specific gaze search parameters in the different specific query search.

* * * * *